(12) United States Patent
Madnani (10) Patent No.: US 8,150,191 B2
(45) Date of Patent: Apr. 3, 2012

(54) METHOD AND SYSTEM FOR CALCULATING BLUR ARTIFACTS IN VIDEOS USING USER PERCEPTION THRESHOLD

(75) Inventor: Shekhar Madnani, Uttar Pradesh (IN)

(73) Assignee: Interra Systems Inc., San Jose, CA (US)

( * ) Notice: Subject to any disclaimer, the term of this patent is extended or adjusted under 35 U.S.C. 154(b) by 814 days.

(21) Appl. No.: 12/287,830

(22) Filed: Oct. 14, 2008

(65) Prior Publication Data

US 2010/0092100 A1 Apr. 15, 2010

(51) Int. Cl.
*G06K 9/40* (2006.01)
(52) U.S. Cl. .......................... 382/255; 382/264
(58) Field of Classification Search .............. 382/255
See application file for complete search history.

(56) References Cited

U.S. PATENT DOCUMENTS

| | | | |
|---|---|---|---|
| 6,548,800 B2 | 4/2003 | Chen et al. | |
| 6,611,627 B1 * | 8/2003 | LaRossa et al. | 382/240 |
| 7,181,082 B2 | 2/2007 | Feng | |
| 7,257,273 B2 * | 8/2007 | Li et al. | 382/286 |
| 7,321,690 B2 | 1/2008 | Lim et al. | |
| 2003/0138163 A1 * | 7/2003 | Chen et al. | 382/274 |
| 2004/0240737 A1 * | 12/2004 | Lim et al. | 382/182 |
| 2006/0204120 A1 * | 9/2006 | Poon et al. | 382/254 |
| 2007/0237241 A1 * | 10/2007 | Ha et al. | 375/240.27 |

OTHER PUBLICATIONS

"Shape from Focus System" by S. Nayar, published in Computer Vision and Pattern Recognition, 1992, IEEE, Computer Society Conference, pp. 302-308 (1992).
"A No-Reference Perceptual Blur Metric" by Pina Marziliano, Frederic Dufaux, Stefan Winkler and Touradj Ebrahimi, published in Image Processing, 2002, IEEE, vol. 3, Jun. 24-28, 2002 pp. III-57-III-60.
"Multiresolution Object-of-Interest Detection for Images With Low Depth of Field" by Jia Li, James J. Wang, Robert M. Gray, and Gio Wiederhold, published in Proceedings of the International Conference on Image Analysis and Processing, Sep. 1999, pp. 32-37.
"Objective Quality Assessment of Coded Images" by G. A. D. Punchihewa, D. G. Bailey, and R. M. Hodgson, published in Proceedings of the Image and Vision Computing New Zealand Conference, 2005, pp. 61-66.
"Fast Extraction of Objects of Interest From Images With Low Depth of Field" by Changick Kim, Jungwoo Park, Jaeho Lee, and Jenq-Neng Hwang, published in ETRI Journal, vol. 29, No. 3, Jun. 2007, pp. 353-362.

* cited by examiner

*Primary Examiner* — David Zarka (57) ABSTRACT

A method and system for calculating a blur artifact in a video are disclosed. The video includes a series of frames captured at a predefined interval of time. The frames include one or more pixels. Calculating the blur artifact in the video includes identifying a focused area in a set of frames. Further, edges are detected in each of the frames. Furthermore, the blur artifact is calculated as a ratio of number of blurred pixels and total number edge pixels.

13 Claims, 6 Drawing Sheets

METHOD AND SYSTEM FOR CALCULATING BLUR ARTIFACTS IN VIDEOS USING USER PERCEPTION THRESHOLD

FIELD OF THE INVENTION

The present invention generally relates to the field of quality checking of a video. More particularly, the invention relates to a method and a system for calculating a blur artifact in the video.

BACKGROUND OF THE INVENTION

Digital video processing is currently used in a variety of applications. Digital video processing includes video acquisition, restoration, encoding, decoding, object recognition, and data filtering and enhancement. The video that is processed during digital video processing includes, but is not limited to, motion pictures and images. During processing, artifacts may be introduced in the video, and it may become distorted. The artifacts cause incorrect visualization of the video. The artifacts include, but are not limited to, an interlace artifact, a blur artifact, an aliasing artifact, a noise artifact, a ringing artifact, and a blockiness artifact. The blur artifact is distinctly visualized in the video, since the blur artifact affects a series of frames included in the video.

The frames of the video are affected by the blur artifact because of various factors. Generally, a video acquisition device is unable to correctly focus the objects to be captured; therefore, the video may become affected by the blur artifact and the noise artifact. Further, a high relative motion between the video acquisition device and the objects to be captured may also cause the blur artifact. As a result of the high relative motion, focusing of the objects by the video acquisition device becomes difficult. Furthermore, there are various additional factors which contribute to the video being affected by the blur artifact. During encoding of the video, some frequency components of the video are lost due to compression algorithms. Therefore, the video is not fully reconstructed while decoding. As a result, the video is affected by the blur artifact. The video can also be affected by the blur artifact during processing of the video. During processing, the high frequency components of the video are passed through low-pass filters, which cause spreading of the edges of the captured objects. The edge spread is then visualized as the blur artifact by the human eye.

The presence of the blur artifact leads to an incorrect perception of the video by the human eye. Therefore, techniques for calculating and subsequently removing the blur artifact from the video are desirable. A number of techniques exist for removing the blur artifact. However, due to inaccurate calculation of the blur artifact, the existing techniques are unable to efficiently remove the blur artifact. Therefore, to efficiently remove the blur artifact, techniques for accurately calculating the blur artifact are desirable.

An existing technique for calculating the blur artifact detects edges in the video and calculates the blur artifact on the basis of the detected edges. This technique is generally applied to the objects in the video which have a high depth of field. However, the incorrect visualization of the video, because of the blur artifact, predominantly occurs in objects with low depth of field in the video. Therefore, the blur artifact calculated by using this technique can be inaccurate. Further, this technique does not calculate a perceived quality of the calculated blur artifact, since the technique does not calculate blurred frames of the video. Moreover, duration of the blur artifact is not calculated.

Another technique for calculating the blur artifact classifies the image into character blocks and background blocks. An energy ratio of the character blocks is then analyzed to calculate the blur artifact in the image. However, this technique does not identify focused areas to calculate the blur artifact in an image. The technique is also computationally intensive and therefore slow.

Still another technique for calculating the blur artifact in the video uses a full reference method. The captured video is compressed during encoding. For the calculation of the blur artifact, the compressed video is decompressed and the pixels of the frames of the compressed video are compared with the pixels of the frames of the captured video. The pixels are compared on the basis of various techniques, such as Peak Signal to Noise Ratio (PSNR), and sum of absolute differences of pixels. Yet another traditional technique for calculating the blur artifact in the video uses a reduced reference method. In the reduced reference method, the features of the pixels are calculated by using various techniques such as a mean of the pixels, or a variance of the pixels. Thereafter, the features of the pixels in the decompressed video and the features of the pixels in the captured video are compared. Subsequently, edges of the objects in the frames of the captured video are detected by an edge detection filter. Still another traditional technique calculates the blur artifact in the video by using a no-reference method. The captured video is compressed and the blur artifact is calculated in the compressed video. The aforementioned techniques calculate the blur artifact in frames of a video. However, no focused area is identified in the frames. As a result, the objects in the video which are not present in the focused area are also considered while calculating the blur artifact. The objects that are not present in the focused area of the frames are less prone than the objects in the focused area to be perceived as being affected by the blur artifact. Therefore, the blur artifact calculated by the aforesaid techniques tends to be inaccurate.

Yet another technique for calculating the blur artifact uses the wavelet method. However, this technique does not identify focused areas before calculating the blur artifact. Therefore, the technique does not calculate the blur artifact for the objects with low depth of field in the video. Still another technique for calculating the blur artifact calculates the blur artifact in a focused area of the image using the Discrete Cosine Transform. Both the aforesaid techniques are computationally intensive, and therefore slow.

Yet another technique for calculating the blur artifact senses the blur artifact in the video by using sensors that are included in the video acquisition device. Subsequently, the focusing of the objects to be captured by the video acquisition device is altered. The altering of the focus reduces the blur artifact in the captured video. However, the perception quality of the calculated blur artifact is not calculated by this technique.

Therefore, there exists a need for a method and a system for calculating a blur artifact in a video. The method and the system should preferably be capable of identifying a focused area in the video, and calculating an accurate value of the blur artifact for the objects in the focused area. Moreover, the method and the system should preferably be capable of calculating the blur artifact for the objects with low depth of field in the video. Furthermore, the method and the system should preferably also be capable of calculating the perceived quality and duration of the blur artifact in the video.

SUMMARY OF THE INVENTION

In an embodiment, the present invention discloses a method for calculating a blur artifact in a motion picture. The motion picture comprises a series of one or more frames defined at a predefined interval of time. The one or more frames include one or more pixels. The method includes detection of one or more edges of the one or more pixels. Thereafter, one or more edge gradients of the edges are compared with a first predefined threshold. Subsequently, one or more edge pixels are determined in the one or more frames. It is determined whether the one or more edge gradients for the one or more edge pixels are greater than or equal to the first predefined threshold. Further, a Sum of modified Laplacian (SML) method is applied to the one or more pixels to determine a set of pixels of the one or more pixels in a set of frames of the one or more frames on the basis of SML values of each of the one or more pixels. Each of the one or more pixels in the set of pixels has the SML values that exceed a second predefined threshold. Subsequently, a set of edge pixels of the one or more edge pixels is determined in the set of pixels based on the SML values. Thereafter, edge spread of the one or more edge pixels included in the set of edge pixels is calculated. Thereafter, one or more blurred edge pixels are determined in the set of edge pixels based on whether the edge spread for the one or more edge pixels exceeds a third predefined threshold. Finally, the blur artifact is calculated as a ratio of a number of the one or more blurred edge pixels in the set of edge pixels and a number of the one or more edge pixels in the set of edge pixels.

In another embodiment, the present invention discloses a system for calculating a blur artifact in a motion picture. The motion picture includes one or more frames defined at a predefined interval of time. The one or more frames include one or more pixels. The system comprises a processor that processes the motion picture. The processor comprises an edge calculator that detects one or more edges of the one or more pixels. Further, the processor comprises a comparator that compares one or more edge gradients of the detected edges with a first predefined threshold. The one or more pixels for which the one or more edge gradients are greater than or equal to the first predefined threshold are known as one or more edge pixels. Thereafter, a focus identifier determines a set of pixels of the one or more pixels in a set of frames of the one or more frames, on the basis of the Sum of Modified Laplacian (SML) method. SML values of each of the one or more pixels are calculated. The comparator compares SML values of each of the one or more pixels in the set of pixels with a second predefined threshold. Each of the one or more pixels in the set of pixels has an SML value greater than or equal to the second predefined threshold. Subsequently, a set of edge pixels of the one or more edge pixels is determined in the set of pixels. Thereafter, the edge calculator calculates edge spread of the one or more edge pixels included in the set of edge pixels. The processor also comprises a blur artifact calculator that determines one or more blurred edge pixels in the set of edge pixels. Each of the one or more blurred edge pixels included in the set of edge pixels has edge spread that is greater than or equal to a third predefined threshold. The edge spread is compared with the third predefined threshold by the comparator. The blur artifact calculator further calculates the blur artifact as a ratio of a number of the one or more blurred edge pixels in the set of edge pixels and a number of the one or more edge pixels in the set of edge pixels.

BRIEF DESCRIPTION OF THE FIGURES

The accompanying figures, wherein like reference numerals refer to identical or functionally similar elements throughout the separate views, and which, together with the detailed description below, are incorporated in and form part of the specification, serve to further illustrate various embodiments and explain various principles and advantages, all in accordance with the present invention.

The embodiments of the invention will hereinafter be described in conjunction with the appended drawings, provided to illustrate and not to limit the invention, wherein like designations denote like elements, and in which.

DETAILED DESCRIPTION OF THE INVENTION

Before describing in detail the particular method used for calculating a blur artifact in a motion picture, in accordance with various embodiments of the present invention, it should be observed that the present invention utilizes a combination of method steps and apparatus components related to the method. Accordingly, the apparatus components and method steps have been represented in the drawings, where appropriate, with conventional symbols, showing only those specific details that are pertinent for an understanding of the present invention, so as not to obscure the disclosure with details that will be readily apparent to those with ordinary skill in the art, having the benefit of the description herein.

In this document, the terms such as 'comprises', 'comprising', 'includes', 'including', or any other variation thereof, are intended to cover a non-exclusive inclusion, such that a process, article, system or apparatus that comprises a list of elements does not include only those elements, but may include other elements not explicitly listed or inherent to such a process, article or apparatus. The term 'another', as used in this document, is defined as at least a second or more. The terms 'includes' and/or 'having', as used herein, are defined as comprising.

Figure 1:
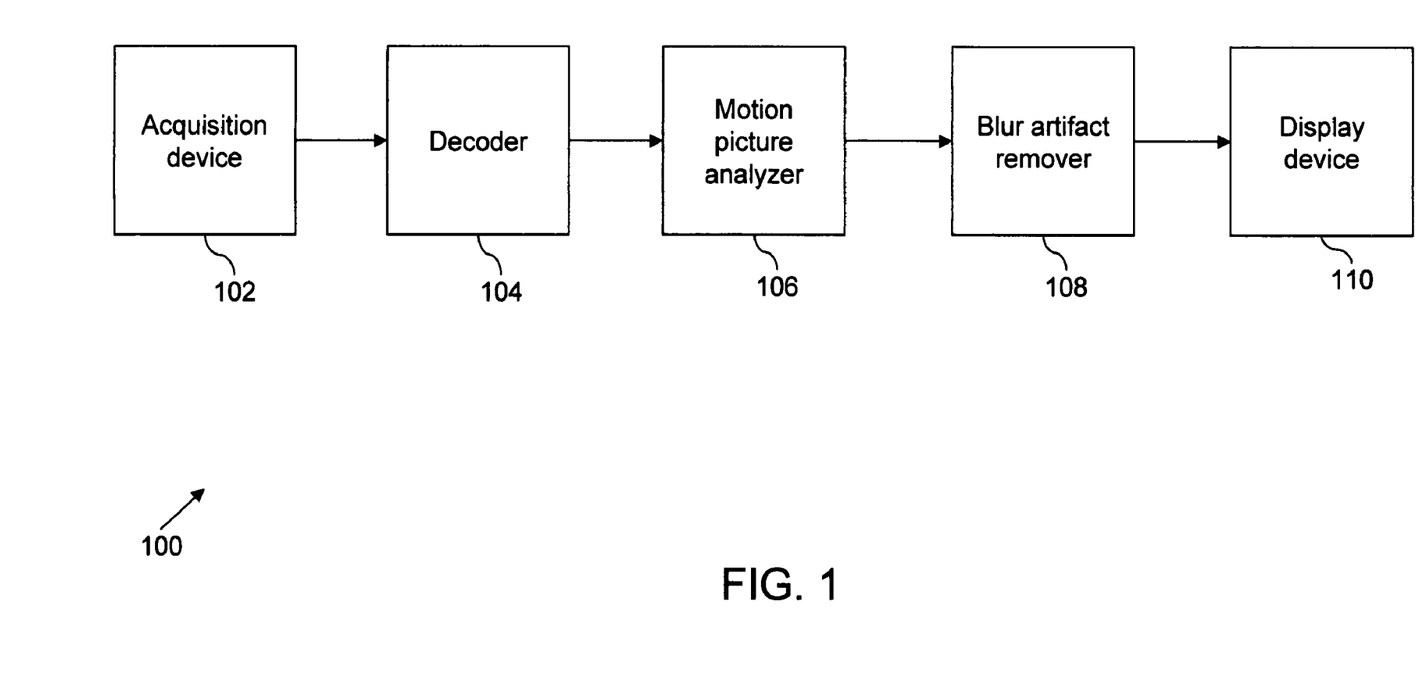
FIG. 1 illustrates a block diagram depicting a system used in quality checking of a motion picture, in accordance with an embodiment of the present invention.

FIG. 1 illustrates a block diagram 100 including an exemplary description of the system used in quality checking of a video, in accordance with an embodiment of the present invention. It should be obvious to persons ordinarily skilled in the art that a video is the same as a motion picture, and the two terms are used interchangeably hereinafter. The block diagram 100 includes an acquisition device 102 that captures the motion picture. The motion picture is captured as a series of one or more frames. There is a predefined time interval between each of the one or more frames. The predefined time interval is too short to be perceived by the human eye. Examples of the acquisition device 102 include an analog motion picture recorder such as a video cassette recording camera, and a digital motion picture recorder such as a digital camera. In the analog motion picture recorder, the captured motion picture is subsequently digitized by a digitizer included in the acquisition device 102. The acquisition device 102 includes sensors and charge coupled devices that help in capturing of color signals of the motion picture. The color signals of the motion picture are then sampled. The sampled color signals in the one or more frames are known as one or more pixels. Thereafter, the one or more frames are forwarded for encoding to an encoder.

The one or more frames are compressed by the encoder using various compression techniques. The compression techniques used for encoding follow compression standards, such as Moving Pictures Experts Group-1 (MPEG-1), Digital Video (DV), H.261, H.263, and Digital Video Express (DivX), which reduce file size of the motion picture. The compressed motion picture is then transmitted over a communication medium. The bandwidth required for the transmission is reduced by compressing the motion picture. According to an embodiment of the present invention, the acquisition device 102 includes the encoder for encoding the captured motion picture.

The compressed motion picture is received by a decoder 104 that decodes the motion picture. The decoded motion picture is perceived as being affected by one or more artifacts. The one or more artifacts include, but are not limited to, an interlace artifact, a blur artifact, a noise artifact, and an aliasing artifact. From among the one or more artifacts, the blur artifact is clearly perceived by the human eye.

The blur artifact is typically introduced in the motion picture when the objects to be captured are inaccurately focused by the acquisition device 102. For example, when there is high relative motion between the acquisition device 102 and the objects to be captured, the acquisition device 102 is unable to accurately measure the focal length of the objects. Further, there are various additional factors which contribute to the blur artifact being introduced in the motion picture. During encoding of the motion picture, when lossy compression algorithms are used, some frequency components of the motion picture are lost. Therefore, the decoder 104 is unable to fully reconstruct the motion picture. Such a motion picture is visualized by the human eye as being affected by the blur artifact. Further, during the processing, the motion picture may be passed through low-pass filters. The low-pass filters allow only the low-frequency components of the motion picture to pass through. However, the high-frequency components undergo spreading after being passed through the low-pass filters. Further, the high-frequency components are present in edges of the captured objects. Due to spreading of the edges, the motion picture is visualized by the human vision as being affected by the blur artifact. The spreading of the edges can be represented by the Gaussian function:

$$H(v) = Ae^{\frac{(v-\beta)^2}{\sigma^2}} \quad (1)$$

Where H(v) is a degradation function, v denotes a pixel value of each of the one or more pixels, which pixel value is calculated based on the luminance of the one or more pixels, A is the maximum value that is achieved by H(v) at v=β, β is the mean of one or more values of v, and σ is the variance of the one or more values of v.

Further, the blur artifact can be represented mathematically in terms of an image degradation model, represented as follows:

$$I'=I*H+N \quad (2)$$

Where, '*' denotes convolution operation,

I is the captured motion picture,

H is a degradation function, which is same as in equation (1)

N is the noise that is injected into the motion picture during degradation, and

I' is the captured motion picture that has been degraded because of introduction of the blur artifact.

The degradation function sometimes results due to inaccurate focus of the captured objects in the motion picture. To remove the blur artifact from the degraded motion picture, accurate calculation of the blur artifact is desirable. The blur artifact is calculated by a motion picture analyzer 106 that analyzes the motion picture received from the decoder 104, and delivers an output in the form of the calculated blur artifact. During the analysis, the motion picture analyzer 106 identifies the objects that are present in a focused area of the captured motion picture. Thereafter, edges of the objects in the focused area are detected. Further, the motion picture analyzer 106 calculates the edges that are affected by the blur artifact. The blur artifact is calculated on the basis of the calculated edges that are affected by the blur artifact. Finally, the calculated blur artifact is reported by the motion picture analyzer 106. In an embodiment of the present invention, the motion picture analyzer 106 transmits a feedback to the acquisition device 102. The feedback includes signals that enable the acquisition device 102 to readjust the focusing for the objects to be captured. This helps in capturing a motion picture which is not affected by the blur artifact. The objects which are accurately focused are not affected by the blur artifact.

The motion picture, after being analyzed by the motion picture analyzer 106, is delivered to a blur artifact remover 108. The blur artifact remover 108 uses traditional techniques to remove the blur artifact from the motion picture, based on the value of the calculated blur artifact. Finally, the motion picture is delivered to a display device 110 that displays the motion picture. Examples of the display device 110 include a thin film transistor (TFT) display, a cathode ray tube (CRT) display, and a plasma display.

Figure 2:
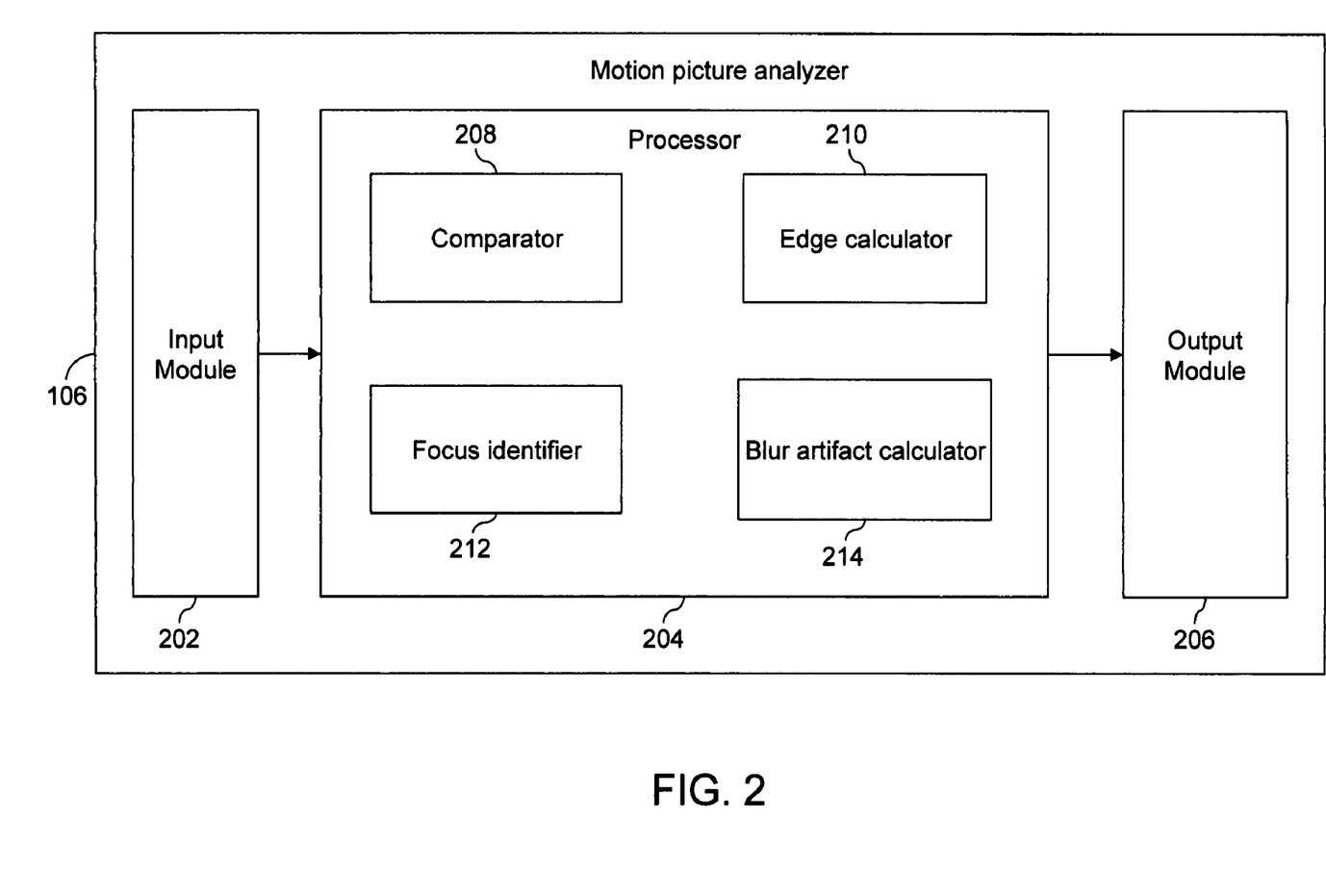
FIG. 2 illustrates a functional block diagram of a motion picture analyzer, in accordance with an embodiment of the present invention.

FIG. 2 illustrates a functional block diagram of the motion picture analyzer 106, in accordance with an embodiment of the present invention. The motion picture analyzer 106 analyzes the motion picture and calculates the blur artifact in the motion picture. The motion picture analyzer 106 includes an input module 202, a processor 204, and an output module 206. The input module 202 receives the one or more frames of the motion picture from the decoder 104 and forwards them to the processor 204. The processor 204 includes a comparator 208, an edge calculator 210, a focus identifier 212, and a blur artifact calculator 214.

The edge calculator 210 detects edges of the captured objects. During processing, when the motion picture is passed through low-pass filters, the edges undergo spreading. The spreading of the edges is perceived as the blur artifact. Further, the edge calculator 210 calculates one or more edge gradients of the edges. The edge detection methods that are used for calculating the edge gradients include, but are not limited to, a Sobel operator, a Canny edge detector, and a Laplacian edge detector.

In an embodiment of the present invention, each of the one or more frames is operated with a 3×3 vertical Sobel operator to detect the edges. The 3×3 vertical Sobel operator is defined as follows:

$$S_x = \begin{pmatrix} -1 & 0 & 1 \\ -2 & 0 & 2 \\ -1 & 0 & 1 \end{pmatrix} \quad (3)$$

Where, $S_x$ denotes the 3×3 vertical Sobel operator.

In another embodiment of the present invention, each of the one or more frames is operated with a 3×3 horizontal Sobel operator. The 3×3 horizontal Sobel operator can be represented by:

$$S_Y = \begin{pmatrix} 1 & 2 & 1 \\ 0 & 0 & 0 \\ -1 & -2 & -1 \end{pmatrix} \quad (4)$$

Where, $S_Y$ denotes the 3×3 horizontal Sobel operator.

After application of the edge detection method, one or more edge gradients of the edges are obtained.

The calculation of the edge gradients can be represented by the following mathematical equation:

$$I_{DX} = I * S_X \quad (5)$$

Where, I denote a frame of the one or more frames of the motion picture,
$I_{DX}$ denotes the frame with the calculated edge gradients, and '*' denotes the convolution operation.

The edge calculator 210 calculates edge gradients of the detected edges in the one or more frames. After calculating the edge gradients, the comparator 208 compares the edge gradients of the one or more pixels with a first predefined threshold. The first predefined threshold is hereinafter denoted by $T_E$. The one or more pixels for which the edge gradients are greater than or equal to the $T_E$ are known as one or more edge pixels. Hereinafter, the edge pixels will be referred to as the valid edge pixels. The comparator 208 sorts the one or more pixels in ascending order of edge gradients. Thereafter, the $T_E$ is determined, such that 80 to 90 percent of the one or more pixels in each of the one or more frames have the edge gradients less than the $T_E$. The $T_E$ is an adaptive threshold, and varies according to the characteristics of the one or more frames. For example, the $T_E$ depends on the contrast of the one or more frames. The value of $T_E$ increases as the contrast of the one or more frames increases.

Since the blur artifact is perceived by the human eye predominantly for the edges of the objects in the focused area of the motion picture, the focused area of the motion picture is identified in a set of frames of the one or more frames. The valid edge pixels are present in an entire frame of the one or more frames whereas a set of valid edge pixels as defined in this application is a collection of the one or more edge pixels that are present only in a specific area of a frame of the set of frames. This specific area is usually referred to as the focused area of the frame. It should be obvious to persons skilled in the art that the set of frames include the one or more frames for which there is no change in the characteristics of the objects in the focused area.

To identify the focused area, the focus identifier 212 applies the Sum of Modified Laplacian (SML) method to each of the one or more pixels to determine SML values of each of the one or more pixels. The Laplacian for a pixel of the captured motion picture can be mathematically represented as follows:

$$\nabla^2 I(x,y) = \frac{\delta^2 I(x,y)}{\delta x^2} + \frac{\delta^2 I(x,y)}{\delta y^2} \quad (6)$$

Where, I(x,y) denotes a pixel of the captured motion picture, and x and y are coordinates of the pixel in a two-dimensional plane.

Thereafter, a second predefined threshold is computed by the comparator 208, based on the maximum SML value. The second predefined threshold is hereinafter denoted by $T_{SML}$. Further, the computation of $T_{SML}$ can be mathematically represented as follows:

$$T_{SML} = \frac{(\text{Maximum SML value}) * Y}{X} \quad (7)$$

Where, X=255 for an 8 bit depth of the motion picture, or X=1024 for a 10 bit depth of the motion picture, and Y varies from 30-50. If the value of Y is determined as 30, the focus area includes a greater number of the one or more pixels. Whereas, if the value of Y is determined as 50, the focus area includes a lesser number of the one or more pixels. However, the variation in the value of the blur artifact will be inconsequential for the cases where Y has a value of 30, or a value of 50.

Equation (6) can be modified to avoid negation of the x and y components of $\nabla^2 I(x,y)$. The resulting modified equation, also known as the Modified Laplacian function, can be represented as follows:

$$ML(x,y) = \left| \frac{\delta^2 I(x,y)}{\delta x^2} \right| + \left| \frac{\delta^2 I(x,y)}{\delta y^2} \right| \quad (8)$$

Where, ML(x,y) represents the Modified Laplacian function.

If ML(x,y) is computed for a 3×3 block of the set of frames, the resulting equation can be represented as follows:

$$ML(x,y) = |2I(x,y) - I(x-\text{step},y) - I(x+\text{step},y)| + |2I(x,y) - I(x,y-\text{step}) - I(x,y+\text{step})| \quad (9)$$

Where "step" defines distance from the pixel for which the ML(x,y) is computed. For example, if the step is 1, the ML(x,y) will be computed from an x-coordinate of x−1 to x+1 and from a y-coordinate of y−1 to y+1, in a two-dimensional plane of the one or more frames. Further, the value of the step is computed on the basis of the accuracy and speed of the operation for which the motion picture analyzer 106 is initially configured. The configuration of the motion picture analyzer 106 is based on a user input.

Thereafter, the comparator 208 compares the SML values with the $T_{SML}$. The focus identifier 212 identifies a set of pixels in the set of frames, based on the output received from the comparator 208. The set of pixels include the one or more pixels with SML values greater than or equal to the $T_{SML}$. Further, the set of pixels is the focused area of the motion picture. Hereinafter, the set of pixels are referred to as $Px_F$. The identification of the $Px_F$ is also based on a focusing operator, denoted by o(x,y). The focusing operator o(x,y) functionally represents a high pass filter. The o(x,y) extracts the valid edge pixels in a focused area for which the frequencies have been attenuated during processing. Further, o(x,y) can be selected on the basis of the value of $\nabla^2 I(x,y)$, as computed in equation (6). When o(x,y) is applied to a motion picture which has been degraded because of inaccurate focusing, the focus area is identified in the set of frames in the motion picture. The motion picture with identified focused area is referred to as r(x,y), which is computed as shown in the following equations:

$$r(x,y) = o(x,y) * I_D(x,y) \quad (10)$$

$$r(x,y) = o(x,y) * (h(x,y) * I_F(x,y)) \quad (11)$$

$$r(x,y) = h(x,y) * (o(x,y) * I_F(x,y)) \quad (12)$$

Where, $I_F(x,y)$ denote the one or more frames for which the focused area has been identified and that has not been degraded, $I_D(x,y)$ denote the one or more frames that have been degraded because of inaccurate focusing, $h(x,y)$ denotes a non-linear degradation function that represents a low-pass filtering process. Further, $h(x,y)$ has a more prominent effect on the high frequency components of the motion picture, and '*' denotes the convolution operation.

In an embodiment of the present invention, the identification of the set of pixels ($Px_F$) is based on the computation of the sum of $ML(x,y)$ values for square shaped areas of side N that are included in the set of frames. N usually has a value of 2 or 4. Size of the square shaped areas is also dependent on the value of the step. A side of the square shaped areas is computed as shown in the following equation:

$$\text{Side} = (\text{step}*2)+1 \quad (13)$$

Where, Side denotes the side of the square shaped areas, and '*' denotes multiplication operation.

If the SML value for a square shaped area is more than or equal to a predefined SML threshold, the square shaped area is a part of the $Px_F$. The computation of SML value can be represented by the following mathematical computation:

$$F(i,j) = \sum_{x=i-N}^{i+N} \sum_{y=j-N}^{j+N} ML(x,y) \forall\, ML(x,y) \geq T_{ML} \quad (14)$$

Where, $F(i,j)$ denotes the $Px_F$ around a pixel of the one or more pixels located at $(i,j)$ in the set of frames, $ML(x,y)$ denotes the Modified Laplacian function, which is computed using equation (8), $T_{ML}$ is the predefined SML threshold, and N denotes the side of the square shaped area in the set of frames for which the SML is computed.

The focus identifier 212 determines a set of edge pixels within the $Px_F$. Identification of the set edge pixels can be represented as follows:

$$Px_{EF} = Px_F \cap Px_E \quad (15)$$

Where, $Px_F$ denotes the set of pixels, which is also referred to as the focused area, $Px_E$ denotes the valid edge pixels, $Px_{EF}$ denotes the set of valid edge pixels present within the focused area, and '∩' denotes intersection operation.

The edge calculator 210 calculates edge spread of the valid edge pixels included in the $Px_{EF}$. In another embodiment of the present invention, the edge spread is calculated for the valid edge pixels in the $Px_E$. Thereafter, the comparator 208 determines one or more blurred edge pixels in the $Px_{EF}$. The edge spread of the valid edge pixels included in the $Px_{EF}$ is compared with a third predefined threshold. The third predefined threshold is hereinafter referred to as $T_B$. The comparator 208 configures the $T_B$ to a value that varies from 8 to 12. However, the value of $T_B$ is determined in accordance with the resolution of the one or more frames. For example, $T_B$ has a value of 8 for a motion picture with low resolution of the one or more frames, whereas $T_B$ has a value of 12 for a motion picture with high resolution of the one or more frames. The valid edge pixels that have edge spread that are greater than or equal to the $T_B$ are one or more blurred edge pixels.

The blur artifact calculator 214 counts the number of the one or more blurred edge pixels (denoted by $N_B$) in the $Px_{EF}$. Further, the number of the valid edge pixels in the $Px_{EF}$ (denoted by $N_E$) is counted. Subsequently, the blur artifact calculator 214 calculates the blur artifact in the motion picture as a ratio of $N_B$ and $N_E$. The blur artifact is then calculated as a percentage in terms of $N_B$ and $N_E$. The calculated blur artifact can be mathematically represented as:

$$BlurArtifact = \frac{N_B * 100}{N_E} \quad (16)$$

The calculated blur artifact is then reported by the output module 206.

To identify perceived blur, the user provides a perception threshold. Thereafter, the comparator 208 compares the blur artifact with the perception threshold. If the blur artifact for a frame of the one or more frames is greater than or equal to the perception threshold, the frame is perceived as blurred. Thereafter, the duration of the blur artifact is calculated for the one or more frames. For calculating the duration of the blur artifact, the time interval between the blurred frames are added starting from a first blurred frame of the blurred frames. Further, since the predefined interval of time between the one or more frames is less than the human perception, some of the frames for which the blur artifact is less than the perception threshold are also considered as blurred frames. Subsequently, the duration of the blur artifact is also reported by the output module 206. An output from the motion picture analyzer 106 is received by the blur artifact remover 108 which removes the blur artifact based on the output provided by the motion picture analyzer 106.

Figure 3:
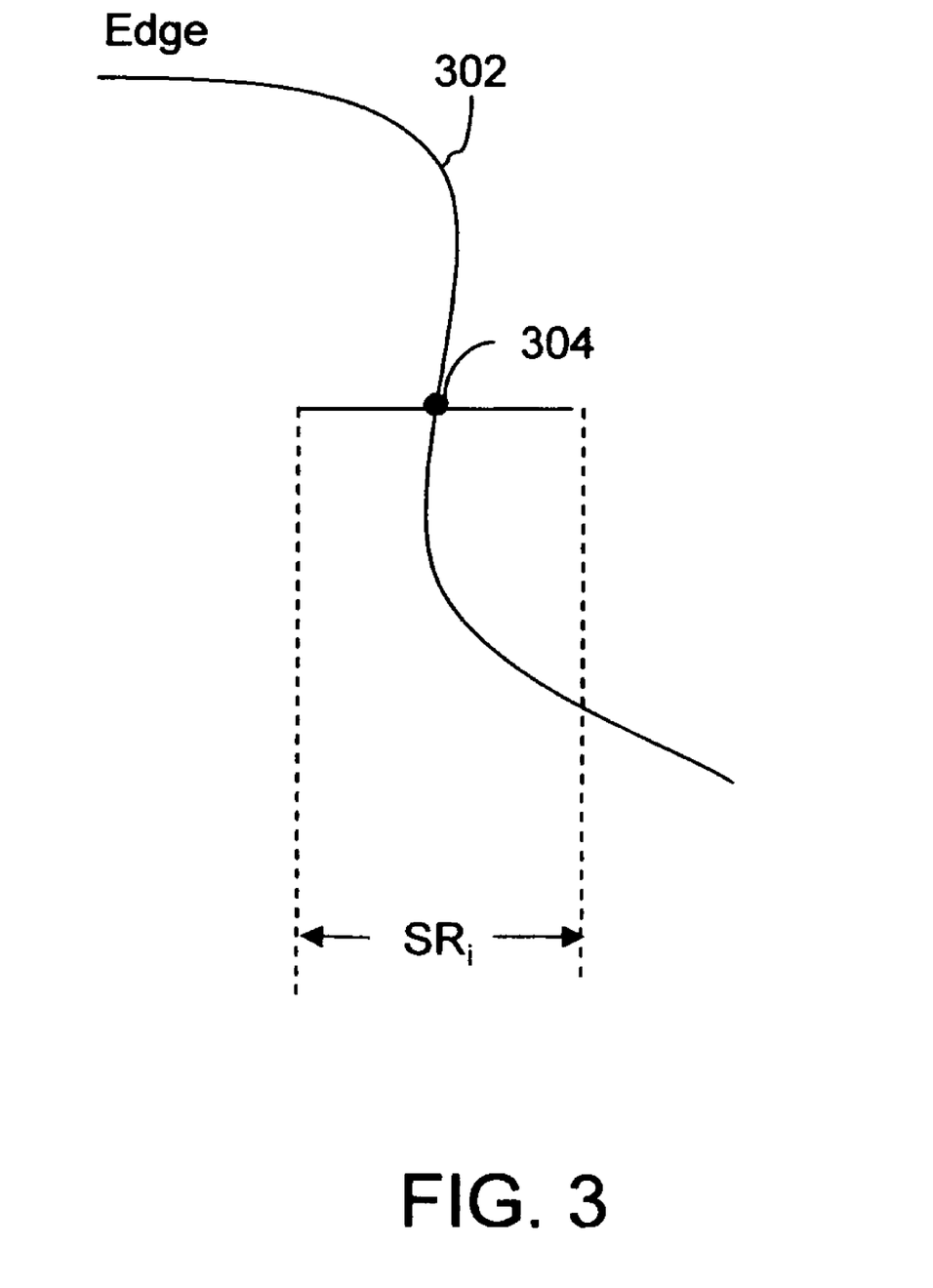
FIG. 3 illustrates spreading of edges of objects in the motion picture, in accordance with an embodiment of the present invention.

FIG. 3 illustrates spreading of edges of objects captured in the motion picture, in accordance with an embodiment of the present invention. An edge 302 of an object that is included in the $Px_{EF}$, is illustrated. The edges of the objects in the $Px_{EF}$ include high frequency components that are prone to be affected by the blur artifact. The edges are detected by the edge calculator 210 using edge detection methods such as a Sobel operator, a Canny edge detector, and a Laplacian edge detector. In an embodiment of the present invention, the edges are detected by using a 3×3 vertical Sobel operator. The 3×3 vertical Sobel operator is represented by equation (3). In another embodiment of the present invention, the 3×3 horizontal Sobel operator as represented by equation (4), can be used to detect the edges.

The edge 302 includes a pixel, $Px_I$ 304, which represents a valid edge pixel. The $Px_I$ 304 includes high-frequency components of the motion picture that are prone to be affected by the blur artifact. Further, during the processing of the motion picture, the $Px_I$ 304 undergoes spreading due to low-pass filtering of the motion picture. After the low-pass filtering is completed, the high-frequency components of the motion picture are visualized as being spread. Each of the valid edge pixels included in the edge 302 undergoes spreading. The edge spread of the edge 302 is denoted by $SR_I$ which is calculated by the edge calculator 210.

The edge calculator 210 identifies the location of the $Px_I$ 304 in the one or more frames. Furthermore, at the identified location, pixel value of the $Px_I$ 304 is calculated. The $SR_I$ is initially configured as 0 at the identified location. The pixel value of the $Px_I$ 304 is compared with the value of the pixels on either side of the $Px_I$ 304. Thereafter, the number of pixels on either side is counted until the values of the pixels stops decreasing or increasing. For example, if the pixel value of the pixel on the immediate right of the identified location is greater than the pixel value of the $Px_I$ 304, then the number of pixels on the right side is counted until the values of the pixels stops increasing. Subsequently, the number of pixels on either side is added to calculate the $SR_I$.

Figure 4:
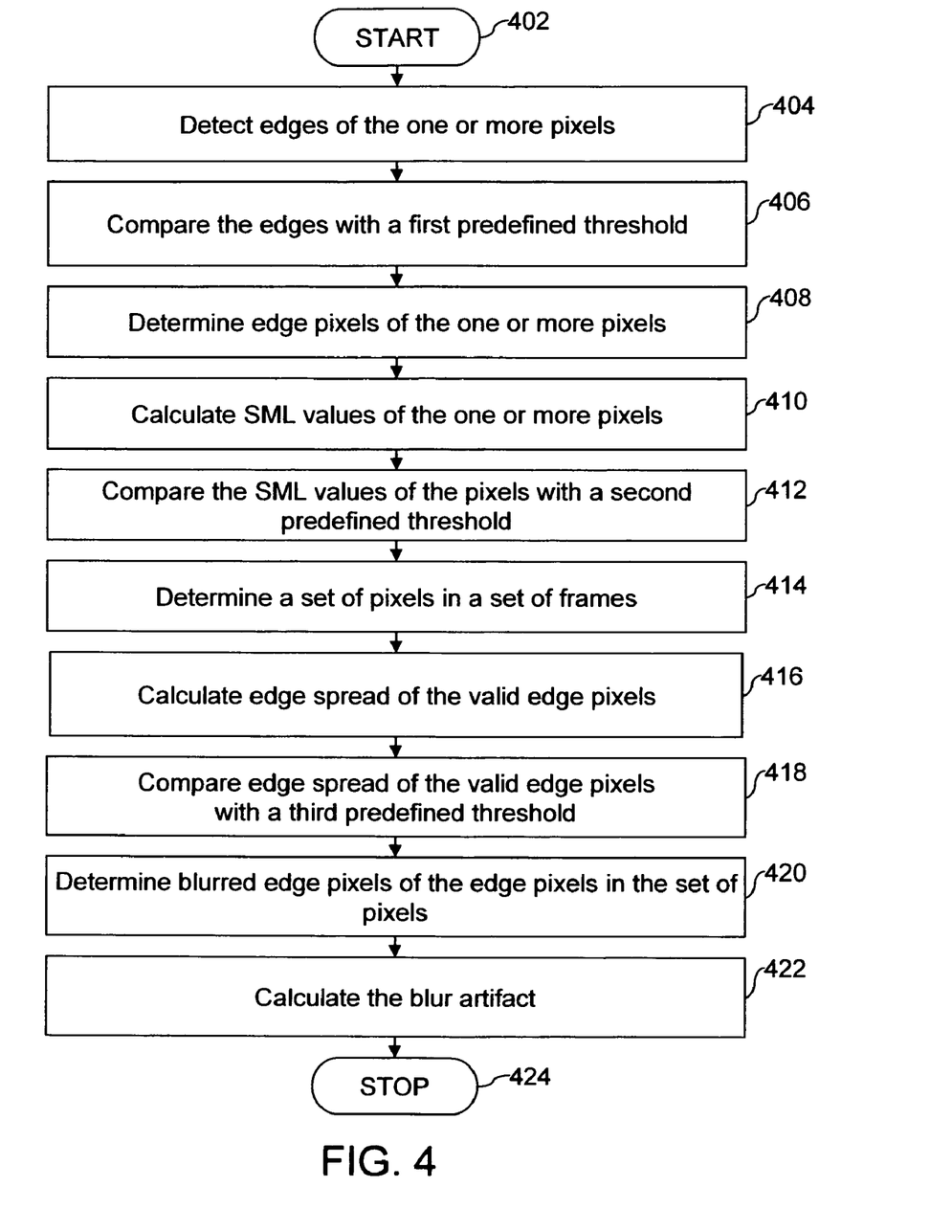
FIG. 4 is a flow diagram illustrating a method for calculating a blur artifact in the motion picture, in accordance with an embodiment of the present invention.

FIG. 4 is a flow diagram illustrating a method for calculating the blur artifact in the motion picture, in accordance with an embodiment of the present invention. To describe the flow diagram, reference will be made to FIG. 1, and FIG. 2. However, it should be understood by persons ordinarily skilled in the art that the flow diagram can also be implemented with reference to any other embodiment of the present invention. The method initiates at step 402. At step 404, the edge calculator 210 detects edges of the one or more pixels in each of the one or more frames. The edge detection methods that are used for detecting the edges include, but are not limited to, a Sobel operator, a Canny edge detector, and a Laplacian edge detector. In an embodiment of the present invention, the one or more frames are operated with a 3×3 vertical Sobel operator to detect the edges. The 3×3 vertical Sobel operator is mathematically defined in equation (3). In another embodiment of the present invention the 3×3 horizontal operator, as represented by equation (4), can also be used to detect the edges.

At step 406, the comparator 208 compares the edges with a first predefined threshold, also referred to as $T_E$. At step 408, one or more edge pixels are determined based on the comparison of edges with the first predefined threshold. The one or more pixels for which edge gradients of the edges are greater than or equal to the $T_E$ are known as valid edge pixels. The comparator 208 sorts the one or more pixels in ascending order of edge gradients. Thereafter, the $T_E$ is determined such that 80 to 90 percent of the one or more pixels in each of the one or more frames have the edge gradients that are less than the $T_E$. At step 410, the focus identifier 212 calculates SML values of the one or more pixels, based on the SML method which is mathematically represented by equations (6)-(8), (9) and (14).

The motion picture is modified to avoid negation of the x and y components of $\nabla^2 I(x,y)$. The resulting modified equation, also known as the Modified Laplacian function, can be represented by equation (8). If ML(x,y) is computed for a set of valid edge pixels having a size of 3×3, the resulting equation can be represented by equation (9). Thereafter, at step 412, the comparator 208 compares the SML values of the one or more pixels with a second predefined threshold. The second predefined threshold is also referred to as $T_{SML}$. Thereafter, at step 414, the focus identifier 212 determines a set of pixels ($Px_F$) in a set of frames. The SML values of the one or more pixels in the $Px_F$ are greater than or equal to the $T_{SML}$. The $Px_F$ denotes the focused area in which the blur artifact is to be calculated. The $Px_F$ is identified using the mathematical equations (10)-(12). Further, the F(i,j) values are compared with a predefined SML threshold by the comparator 208, as represented by equation (14). Thereafter, the valid edge pixels within the $Px_F$ which are greater than or equal to the predefined SML threshold are determined by the focus identifier 212. The valid edge pixels which are greater than or equal to the predefined SML threshold, are denoted by $Px_{EF}$.

At step 416, the edge calculator 210 calculates edge spread of the valid edge pixels included in the $Px_{EF}$. Thereafter, at step 418, the comparator 208 compares edge spread of the valid edge pixels included in the $Px_{EF}$ with a third predefined threshold, also referred to as $T_B$. Further, at step 420, the comparator 208 determines one or more blurred edge pixels of the set of valid edge pixels within the $Px_{EF}$. The valid edge pixels in the $Px_{EF}$ that have edge spreads that are greater than or equal to the $T_B$ are the one or more blurred edge pixels. Thereafter, at step 422, the blur artifact calculator 214 calculates the blur artifact. For this calculation, the blur artifact calculator 214 counts the number of the one or more blurred edge pixels (denoted by $N_B$) in the $Px_{EF}$. Further, the number of the valid edge pixels in the $Px_{EF}$ is counted (denoted by $N_E$). Subsequently, the blur artifact calculator 214 calculates the blur artifact in the motion picture as a ratio of $N_B$ and $N_E$. The blur artifact is then calculated as a percentage in terms of $N_B$ and $N_E$ (represented by equation (16)). The calculated blur artifact is then reported by the output module 206 to the blur artifact remover 108. Finally, the method terminates at step 424.

Figure 5:
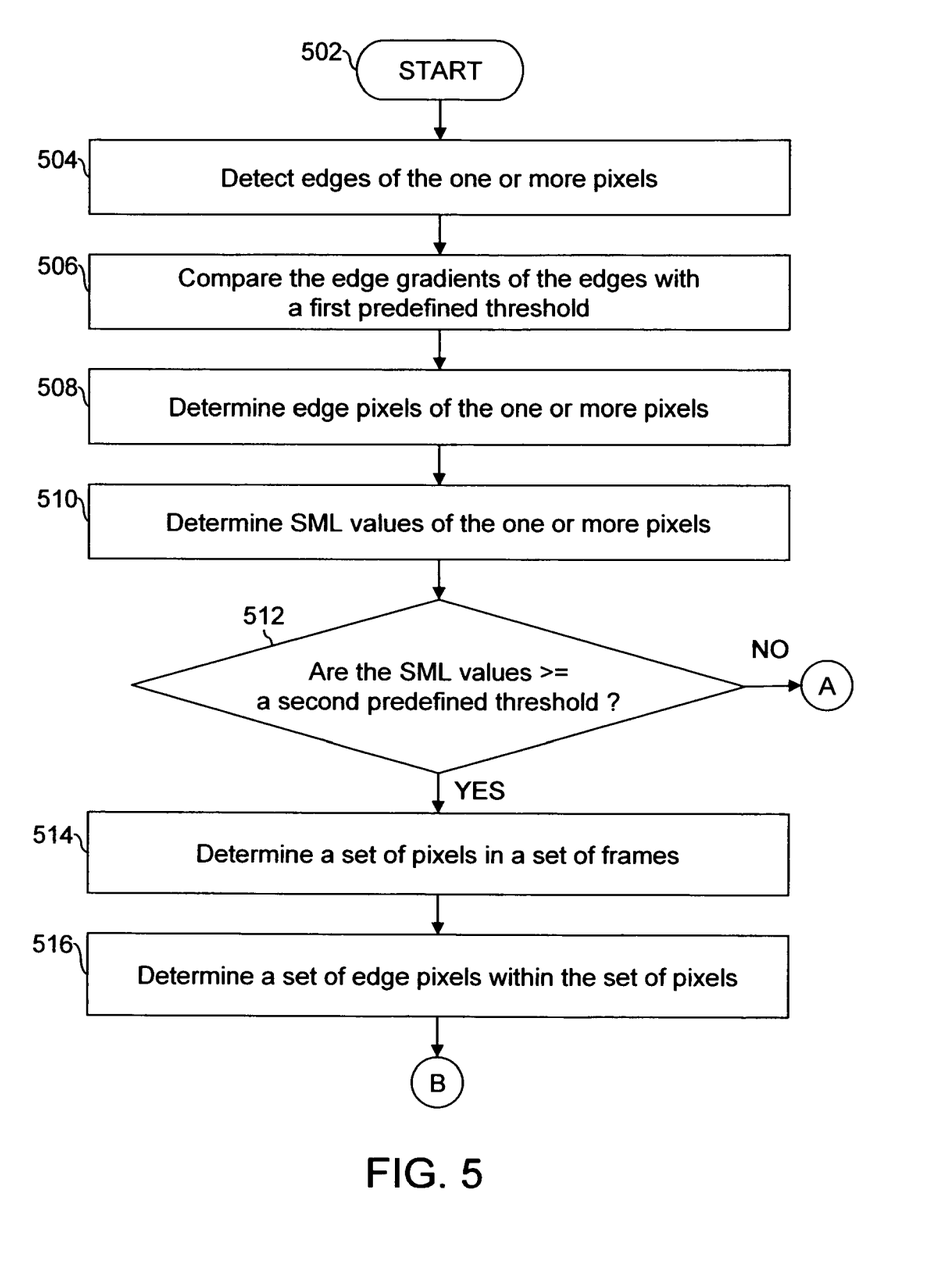
FIGS. 5 and 6 are flow diagrams illustrating a method for calculating the blur artifact in the motion picture, in accordance with another embodiment of the present invention.
Figure 6:
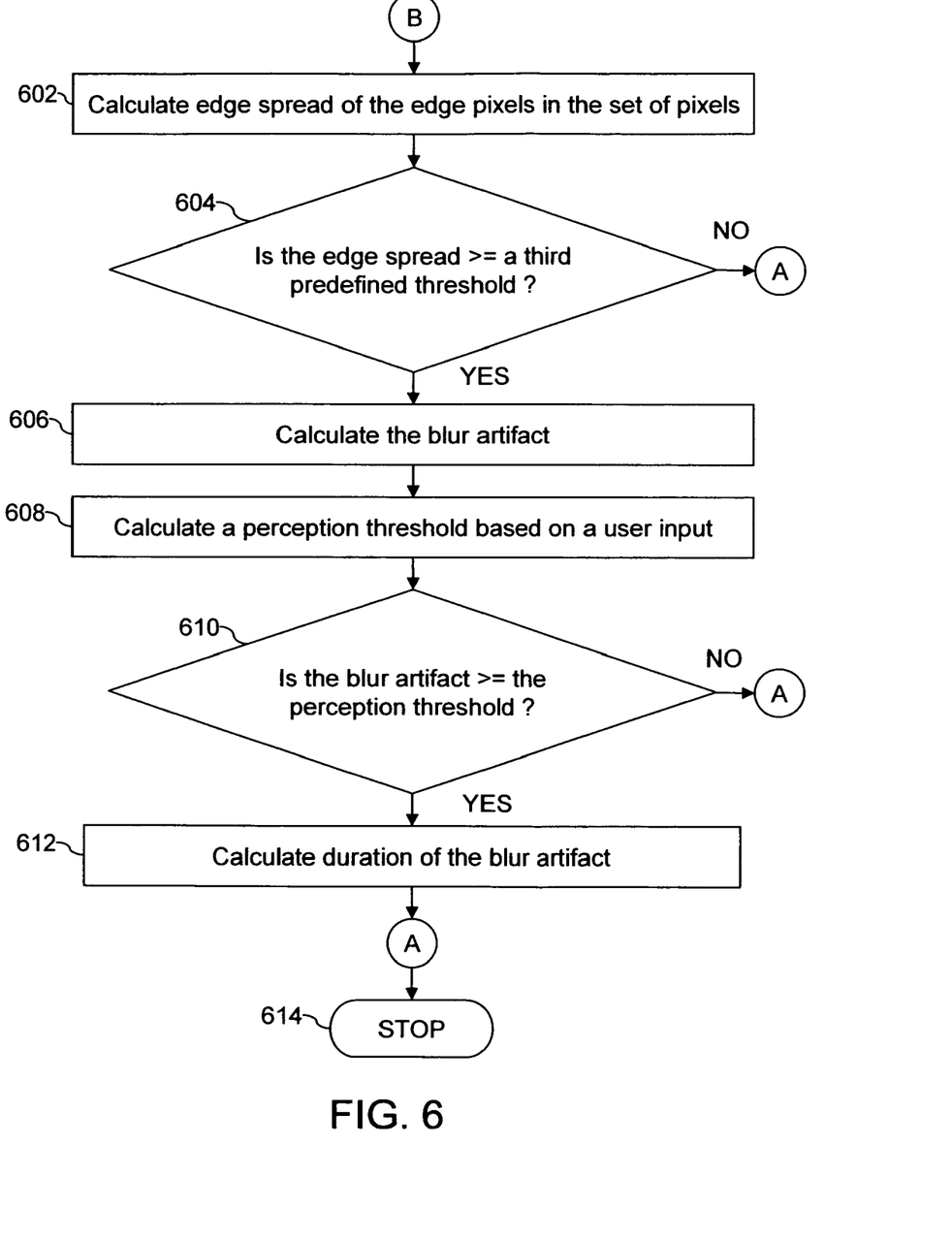

FIGS. 5, and 6 are flow diagrams illustrating a method for calculating the blur artifact in the motion picture, in accordance with another embodiment of the present invention. To describe the flow diagrams, reference will be made to FIG. 1 and FIG. 2. However, it should be understood by persons ordinarily skilled in the art that the flow diagrams can also be implemented with reference to any other embodiment of the present invention. The method initiates at step 502. At step 504, the edge calculator 210 detects edges of the objects in the motion picture. The edge detection methods include, but are not limited to, a Sobel operator, a Canny edge detector, and a Laplacian edge detector. In an embodiment of the present invention, each of the one or more frames is operated with a 3×3 vertical Sobel operator to detect the edges. The 3×3 vertical Sobel operator is defined in equation (3). In another embodiment of the present invention, the 3×3 horizontal Sobel operator, as represented by equation (4), can also be used for detecting the edges. Detection of the edges includes calculation of the one or more edge gradients.

At step 506, the comparator 208 compares the one or more edge gradients of the detected edges with a first predefined threshold, also referred to as $T_E$. $T_E$ is determined such that 80 to 90 percent of the one or more pixels in each of the one or more frames have the magnitude of the edge gradients less than the $T_E$.

At step 508, valid edge pixels are determined. The one or more pixels with the edge gradients that are greater than or equal to the $T_E$ are the valid edge pixels. The comparator 208 sorts the one or more pixels in ascending order of edge gradients. Thereafter, at step 510, the focus identifier 212 determines SML values of the one or more pixels. The SML method can be represented by the mathematical equations (6), (8), (9), and (14). Further, equation (6) is modified to avoid negation of the x and y components of $\nabla^2 I(x,y)$. The resulting modified equation, also known as the Modified Laplacian function, can be represented by equation (8).

At step 512, the comparator 208 compares the SML values with a second predefined threshold, also referred to as $T_{SML}$. If any of the one or more pixel values are greater than or equal to the $T_{SML}$, step 514 is executed. If, however, none of the SML values are less than the $T_{SML}$, the method terminates. Further, at step 514, the focus identifier 212 identifies a set of pixels in the set of frames on the basis of the output received from the comparator 208. The set of pixels is also referred to as $Px_F$ which include the one or more pixels with SML values greater than or equal to the $T_{SML}$. Further, the set of pixels is also known as the focused area of the motion picture. In an embodiment of the present invention, the identification of the $Px_F$ is also based on a focusing operator, denoted by o(x,y). The focusing operator o(x,y) represents a high-pass filter. When o(x,y) is applied to a motion picture which has been degraded because of inaccurate focus measure, the motion picture with identified focused area is calculated. The motion picture with identified focused area is referred to as r(x,y), which is computed as shown in equations (10)-(12).

The o(x,y) extracts the valid edge pixels in the set of valid edge pixels for which the frequency components have been attenuated during processing. Further, the focusing operator o(x,y) represents a high pass filter. Furthermore, o(x,y) can be selected on the basis of the value of $\nabla^2 I(x,y)$, as computed in equation (6).

Thereafter, at step 516, the comparator compares the F(i,j) values with a predefined SML threshold, as represented by equation (14). Thereafter, the focus identifier 212 determines a set of valid edge pixels which include the valid edge pixels with the SML values that are greater than or equal to the predefined SML threshold within the $Px_F$.

At step 602, the edge calculator 210 calculates edge spread for the valid edge pixels included in the $Px_{EF}$. Thereafter, at step 604, the comparator 208 compares the edge spread for the valid edge pixels with a third predefined threshold. The third predefined threshold is also referred to as $T_B$. The valid edge pixels that have edge spread that are greater than or equal to the $T_B$ are one or more blurred edge pixels, and step 606 is executed. If, however, all of the edge spreads of the valid edge pixels are less than the $T_B$, the method terminates.

Thereafter, at step 606, the blur artifact calculator 214 counts the number of the one or more blurred edge pixels (denoted by $N_B$) within the $Px_{EF}$. Further, the number of the valid edge pixels in the $Px_{EF}$ is counted (denoted by $N_E$). Subsequently, the blur artifact calculator 214 calculates the blur artifact in the motion picture as a ratio of $N_B$ and $N_E$. The blur artifact is then calculated as a percentage in terms of $N_B$ and $N_E$. The calculated blur artifact can be represented by equation (16). The calculated blur artifact is then reported by the output module 206 to the blur artifact remover 108.

At step 608, the blur artifact calculator 214 calculates a perception threshold, based on an input by a user. Subsequently, at step 610, the blur artifact is compared with the perception threshold. If the blur artifact of a frame of the one or more frames is greater than or equal to the perception threshold, the frame is a blurred frame, and step 612 is executed. If, however, the blur artifact of the frame is less than the perception threshold, the method terminates. Further, at step 612, the duration of the blur artifact is calculated. For this calculation, the time intervals between the blurred frames of the motion picture are added, starting from the first blurred frame. Furthermore, since the predefined interval of time between the one or more frames is less than the human perception, some of the one or more frames for which the blur artifact is less than the perception threshold are also considered as the blurred frames. The interval of time between two consecutive frames of the one or more frames is less than the time taken for perception of an object by the human vision. Finally, the method terminates at step 614.

Various embodiments, as discussed above, provide a method and a system for calculating blur artifact in motion pictures. The method and the system are used for identifying a focused area in the motion picture. An accurate value of the blur artifact is calculated on the basis of the identified focused area. The method and the system are also useful for calculating the blur artifact in the motion picture with low depth of field. The objects with low depth of field in the motion picture are usually inaccurately focused. The method and the system help in automatically correcting the focus measure for the objects with low depth of field in the motion picture. The method and the system can also be used for calculating a perceived quality and duration of the blur artifact in the motion picture. The method and the system are computationally less intensive, and therefore, are faster than traditional methods for calculating the blur artifact.

The method and system for calculating the blur artifact in a motion picture, as described in the present invention, may be embodied in the form of a computer system. Typical examples of a computer system include a general-purpose computer, a programmed microprocessor, a micro-controller, a peripheral IC element, and other devices or arrangements of devices that are capable of implementing the steps that constitute the method of the present invention.

The computer system may comprise a computer, an input device, and a display unit. The computer may comprise a microprocessor, which is connected to a communication bus. The computer also includes a memory, which may include Random Access Memory (RAM) and Read Only Memory (ROM). Further, the computer system comprises a storage device, which can be a hard disk drive or a removable storage drive such as a floppy disk drive, an optical disk drive, and the like. The storage device can also be other similar means for loading computer programs or other instructions into the computer system.

The computer system executes a set of instructions that are stored in one or more storage elements to process input data. The storage elements may also store data or other information, as desired, and may be in the form of an information source or a physical memory element present in the processing machine. Exemplary storage elements include a hard disk, a DRAM, an SRAM and an EPROM. Storage elements may also be external to the computer system, and be connected to or inserted into the computer, to be downloaded at or prior to the time of use. Examples of such external computer program products include computer-readable storage mediums such as CD-ROMS, flash chips, floppy disks, and the like.

The set of instructions may include various commands that instruct a processing machine to perform specific tasks, such as the steps that constitute the method of the present invention. The set of instructions may be in the form of a software program. The software may be in various forms, such as system or application software. Further, the software may be in the form of a collection of separate programs, a program module with a larger program, or a portion of a program module. The software may also include modular programming in the form of object-oriented programming. The software program containing the set of instructions can be embedded in a computer program product for use with a computer, with the computer program product comprising a computer-usable medium that has a computer-readable program code embodied therein. Processing of input data by the processing machine may be in response to users' commands, to the result of previous processing, or in response to a request made by another processing machine.

The modules described herein may include processors and program instructions that implement the functions of the modules described herein. Some or all the functions can be implemented by a state machine that has no stored program instructions, or in one or more application-specific integrated circuits (ASICs), in which each function or some combinations of certain of the functions are implemented as custom logic.

In the foregoing specification, the invention and its benefits and advantages have been described with reference to specific embodiments. However, persons with ordinary skill in the art would appreciate that various modifications and changes can be made, without departing from the scope of the present invention, as set forth in the claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application and all equivalents of those claims, as issued.

What is claimed is:

1. A computer implemented method for calculating a blur artifact in a motion picture, the motion picture comprising one or more frames defined at a predefined interval of time, each of the one or more frames comprising one or more pixels, the computer implemented method comprising:
 determining a set of pixels in a set of frames, wherein the set of pixels comprises one or more pixels having a Sum of Modified Laplacian value that exceeds a second predefined threshold, and wherein a set of edge pixels is determined in the set of pixels, the set of pixels being a focus area of the motion picture;
 calculating an edge spread of the set of edge pixels;
 determining a set of blurred edge pixels in the set of edge pixels, wherein the set of blurred edge pixels comprises the one or more edge pixels of the set of edge pixels for which the edge spread exceeds a third predefined threshold; and
 calculating the blur artifact as a ratio of a number of the blurred edge pixels in the set of the blurred edge pixels and a number of the edge pixels in the set of edge pixels, wherein calculating the blur artifact comprises:
  calculating a perception threshold based on a user input; and
  comparing the calculated blur artifact with the perception threshold.

2. The computer implemented method according to claim 1 further comprising:
 detecting edges of the one or more pixels, wherein the edges are detected using an edge detection method selected from a group consisting of a Sobel operator method, a Canny edge detector method, and a Laplacian edge detector method;
 comparing the detected edges with a first predefined threshold; and
 determining one or more valid edge pixels, wherein the one or more valid edge pixels has the edges that exceed the first predefined threshold.

3. The computer implemented method according to claim 2, wherein detecting the edges comprises calculating one or more edge gradients of the detected edges.

4. The computer implemented method according to claim 1, wherein calculating the blur artifact comprises calculating a duration of the blur artifact when the calculated blur artifact exceeds the perception threshold.

5. A system for calculating a blur artifact in a motion picture, the motion picture comprising one or more frames defined at a predefined interval of time, each of the one or more frames comprising one or more pixels, the system comprising:
 a focus identifier, the focus identifier being capable of determining a set of pixels in a set of frames, wherein the set of pixels comprises one or more pixels having a Sum of Modified Laplacian value that exceeds a second predefined threshold, and wherein a set of edge pixels is determined in the set of pixels, the set of pixels being a focus area of the motion picture; and
 a blur artifact calculator, the blur artifact calculator being capable of:
  determining a set of blurred edge pixels in the set of edge pixels, wherein the set of blurred edge pixels comprises the one or more edge pixels of the set of edge pixels for which an edge spread exceeds a third predefined threshold;
  calculating the blur artifact as a ratio of a number of the blurred edge pixels in the set of the blurred edge pixels and a number of the edge pixels in the set of edge pixels, wherein calculating the blur artifact comprises calculating a perception threshold based on user input, wherein the calculated blur artifact is compared with the perception threshold by the comparator.

6. The system according to claim 5, wherein the system further comprises an input module, the input module being capable of receiving the motion picture.

7. The system according to claim 5, wherein the system further comprises an output module, the output module being capable of displaying the calculated blur artifact.

8. The system according to claim 5, wherein the blur artifact calculator further is capable of:
 calculating duration of the blur artifact when the calculated blur artifact exceeds the perception threshold.

9. The system according to claim 5 further comprising:
 an edge calculator, the edge calculator being capable of:
  detecting edges of the one or more pixels; and
  calculating edge spread of the one or more pixels, wherein the edge calculator is capable of detecting the edges using an edge detection method selected from a group consisting of a Sobel operator, a Canny edge detector, and a Laplacian edge detector,
 a comparator, the comparator being capable of:
  comparing the edges with a first predefined threshold; and
  determining one or more valid edge pixels, wherein the one or more valid edge pixels have the edges that exceed the first predefined threshold.

10. The system according to claim 9, wherein the edge calculator is further capable of calculating one or more edge gradients of the detected edges.

11. A computer program product for calculating a blur artifact in a motion picture, the motion picture comprising one or more frames defined at a predefined interval of time, each of the one or more frames comprising one or more pixels, the computer program product comprising instructions stored in a non-transitory computer readable medium, the instructions comprising:
 program instructions for determining a set of pixels in a set of frames, wherein the set of pixels comprises one or more pixels having a Sum of Modified Laplacian value that exceeds a second predefined threshold, and wherein a set of edge pixels is determined in the set of pixels, the set of pixels being a focus area of the motion picture;
 program instructions for calculating an edge spread of the set of edge pixels;
 program instructions for determining a set of blurred edge pixels in the set of edge pixels, wherein the set of blurred edge pixels comprises the one or more edge pixels of the set of edge pixels for which the edge spread exceeds a third predefined threshold; and
 program instructions for calculating the blur artifact as a ratio of a number of the blurred edge pixels in the set of blurred edge pixels and a number of the edge pixels in the set of edge pixels, wherein the program instructions for calculating the blur artifact comprises;

calculating a perception threshold, based on user input; and comparing the calculated blur artifact with a perception threshold.

12. The computer program product according to claim 11, wherein the instructions further comprising:

program instructions for detecting edges of the one or more pixels, wherein the program instructions for detecting the edges comprise program instructions for calculating one or more edge gradients of the detected edges;

program instructions for comparing the detected edges with a first predefined threshold; and program instructions for determining one or more valid edge pixels, wherein the one or more valid edge pixels have the detected edges that exceed the first predefined threshold.

13. The computer program product according to claim 11, wherein program instructions for calculating the blur artifact comprise:
and program instructions for calculating a duration of the blur artifact when the calculated blur artifact exceeds the perception threshold.

* * * * *